UNITED STATES PATENT OFFICE.

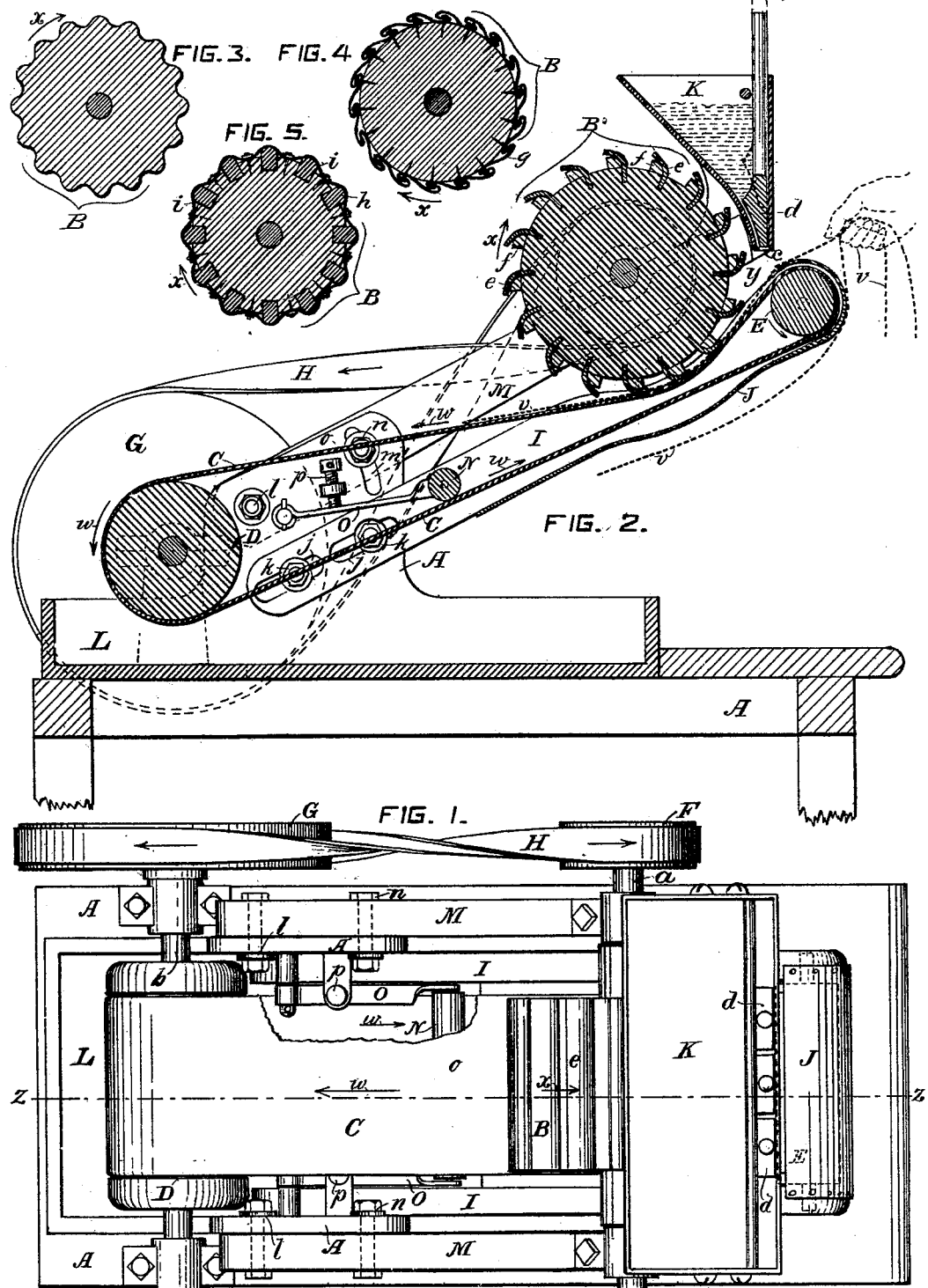

NICHOLAS TAYLOR, OF TROY, NEW YORK.

STARCHING-MACHINE.

SPECIFICATION forming part of Letters Patent No. 233,124, dated October 12, 1880.

Application filed March 22, 1880. (No model.)

*To all whom it may concern:*

Be it known that I, NICHOLAS TAYLOR, of the city of Troy, in the county of Rensselaer and State of New York, have invented certain new and useful Improvements in Starching-Machines, of which the following is a specification.

My invention relates to improvements in machines for rubbing semi-fluid starch into collars, cuffs, shirts, and similar articles of woven fabric by means of a rotary rubbing-roll having alternate projections and depressions in its circumferential surface and a support for the articles; and the principal objects of my invention are to provide improved means for supporting the articles with a yielding pressure against the rubbing-roll, for rubbing the semi-fluid starch into the fibers or texture of the two opposite surfaces of the articles at the same time; for simultaneously rubbing the starch into the texture of both sides of the bosom or front of a shirt without rubbing the starch into the back thereof, and for supplying the starch as required to the combined rubbing-roll and support for the articles being starched. I attain these results by the mechanism illustrated in the accompanying drawings, in which—

Figure 1 is a plan of the main portion of one of my improved starching-machines, and Fig. 2 is a vertical longitudinal section of the same at the line *z z* in Fig. 1, and elevation of the parts at one side of that line. Figs. 3, 4, and 5 are transverse sections, on a smaller scale, of various forms of rubbing-rolls for use in the same machine.

Like letters refer to similar parts in the different figures.

A is a frame or stationary support for the other parts of the machine. B is a rubbing-roll with journals mounted to rotate in suitable bearings on the frame, and having its rubbing-surface longitudinally ribbed, corrugated, or composed of a series of alternate projections and depressions. C is an endless apron, of canvas or other suitable flexible starch-holding material, stretching and extending around and supported by rollers D E, and arranged with a part of one stretch of the endless apron against and conforming to a part of the projecting portions of the surface of the rubbing-roll, so that when the articles to be starched are held by hand or otherwise between the contiguous parts of the endless apron and rubbing-roll the articles will be supported against that roll with a yielding flexible pressure, resulting from the flexibility and yielding quality of the stretched endless apron, and especially suited to insure the strong but somewhat yielding pressure required in rubbing starch of a semi-fluid or jelly-like consistence into the fibers or texture of the articles by means of the roll B, having its surface composed of alternate projections and depressions.

For rubbing the starch into one side or surface only of the articles at one operation, the endless apron C can be left free to be turned by the frictional contact of the rotary rubbing-roll B against the apron and articles being starched thereon. Thick collars, cuffs, shirt-bosoms, and other articles can be more quickly filled with starch by rubbing the same into the texture of both sides or surfaces of the articles simultaneously, and for that purpose I combine, with the rubbing-roll B and endless apron C, any suitable known means which shall cause the apron to be surely turned simultaneously with and in the same direction as the contiguous part of the surface of the rubbing-roll. This result is secured in the machine shown in the drawings by means of a pulley, F, fast on the shaft *a* of the rubbing-roll, a pulley, G, fast on the shaft *b* of one supporting-roller, D, of the endless apron, and a belt, H, extending around those pulleys. In this case the circumferences of the pulleys F G and rollers B D are shown proportioned so that the endless apron C shall turn at a slower surface speed than the circumference of the rubbing-roll, as I generally prefer. I sometimes secure the same result by connecting the shaft of the rubbing-roll to the shaft of one of the supporting-rolls of the endless apron by suitable gear-wheels.

It is generally necessary to highly starch the bosoms or fronts of shirts, and is at the same time desirable to not starch the backs thereof. To that end I make the endless apron C, its supporting-roller E, and the support I for that roller in such narrow and projecting or arm-like form, extending past the rubbing-roll B, essentially as shown in the drawings, that the tubular body of a shirt can be drawn upon so as to loosely surround the projecting end part of the endless apron and its arm-like support in such manner that only one side part of the tubular shirt-body shall be between the endless apron and the rubbing-roll, and so that the roll and the apron can rub the starch into both surfaces of the bosom or front of the shirt without rubbing the starch into the back thereof.

J is a guard, secured to the arm-like support I along that part of the projecting portion of the endless apron C which is not in the stretch next to the rubbing-roll B, so as to thereby prevent contact of the back of the shirt with the starch-covered endless apron while the shirt-body surrounds the projecting portion of the apron and its support, and the starch is being rubbed into the front of the shirt by and between the endless apron and rubbing-roll.

The semi-fluid starch can be supplied to the rubbing-roll B, apron C, or articles to be starched by any suitable mode or means. I, however, generally prefer to arrange for that purpose a starch-holding reservoir, K, having in its lower part a contracted opening or openings, c, directly over the entrance y, between the rubbing-roll and apron, and closed by a movable valve or valves, d, so that a person using the machine can at any time, by properly opening and closing, or lifting up and pressing down, the valve or valves d, readily supply from the reservoir K to the apron C, roll B, and articles being thereby starched, whatever different quantities of starch shall be needed.

In using the machine the rubbing-roll B is revolved in the direction pointed by the arrow x, and the apron C turns in the direction indicated by the arrow w. One end portion of the article to be starched is introduced at y, Fig. 2, and is drawn in by and between the rubbing-roll and apron, while the other end part of the article is held and retained by the hand or hands of the person using the machine, somewhat as indicated by dotted lines at v in Fig. 2, so that the person can thereby readily draw back the article from between the rubbing-roll and apron and let it be drawn in again, and thereby subject different parts of the article to proper equal or various degrees of rubbing, as shall be required, by and between the apron and rubbing-roll.

L is a box to receive superfluous starch that shall be discharged from the endless apron.

It is necessary that the rubbing-roll B in my improved starching-machine shall not have a uniform, plain, smooth, hard cylindrical surface, like a common ironing or polishing roller, which latter cannot, when revolving in contact with a traveling endless apron, engage with and carry forward successive portions of the paste-like starch commonly used in starching collars and cuffs; and it is essential, in my invention, that the rubbing-roller B shall have suitable ribs or corrugations, or alternate projections and depressions, around its circumference, so that, in combination with the endless apron C, the ribs or projections of the roller shall successively engage with and carry along successive portions of the paste-like starch, and thereby progressively apply the same in suitable quantities to the articles supported by the endless apron, and at the same time thoroughly press, beat, and force the semi-fluid starch into the texture of the articles by the rapidly-repeated short blows or concussions of the series of ribs or projections of the roller against the articles on the yielding endless apron. Several varieties of such beating and rubbing rolls are represented in the drawings.

In Figs. 1 and 2 the roll B has a series of flexible strips, e, of vulcanized india-rubber fabric fastened at one edge part to the body of the roll, and arranged to bend over and be supported by the curved outer surfaces of longitudinal ribs f, fast on the roll-body.

In Fig. 3 the rubbing-roll is a simple corrugated cylinder, which can be of wood or other suitable hard or rigid material, or of any suitable somewhat elastic substance.

In Fig. 4 the rubbing-roll is a plain cylinder covered by a flexible textile fabric or canvas, g, laid in plaits and fastened to the cylinder, which can be of wood.

In Fig. 5 the rubbing-roll has longitudinal ribs h, which can be of rigid or somewhat elastic material, and are covered by a layer or layers, i, of canvas or other suitable fabric, secured to the roll-body in the intervals between the ribs.

As a convenient means for tightening the stretches of the apron C and securing different degrees of tension therein, I commonly make the projecting support I of its end roller, E, adjustable endwise, by having therein slots j and fastening screw-bolts k, extending through the slots and secured to the stationary framework A, on which the shaft of the other supporting-roller, D, of the endless apron is mounted.

For conveniently altering the degree of pressure between the rubbing-roll and endless apron, I sometimes journal the shaft a of the roll B in arms M, that are pivoted at l to the frame A, having slots m, through which extend screw-bolts n, that are secured to said arms, so that the roll B can be thereby adjusted to bear and rub against the apron C with different degrees of pressure, according to the various degrees of thickness, size, strength, or delicacy of the articles to be starched.

For giving different degrees of elasticity to the pressure of the stretch o of the endless apron against the longitudinally ribbed or corrugated rubbing-roll, I sometimes arrange against one stretch of the apron a roller, N, journaled in bearings on or against any suitable springs, O, that are supported by the framework and are pressed against by screws p, so that the tension-roller N can be thereby adjusted to bear against the inner surface of the endless apron with various degrees of spring-pressure, and consequently force the stretch $o$ of the apron against the rubbing-roll B with different degrees of yielding force in rubbing the starch into articles of various sizes and thicknesses. For a similar purpose the journals of the rubbing-roll can be held by movable boxes pressed by adjustable springs to force the rubbing-roll against the apron with various degrees of elastic yielding pressure.

I am aware that before my present invention starching-machines have been devised with a rubbing-roll in combination with a movable or moving device for supporting the articles while being acted upon by the rubbing-roll, and I do not broadly claim such a combination.

I am also aware that an ironing-machine has been devised with a rotary polishing-roller having a plain, smooth, hard metallic surface in contact with the outer surface of one stretch of an endless apron made to turn at a different surface speed from the polishing-roller, and pressed against the latter in some degree by a gravitating roller bearing upon the inner surface of another stretch of the endless apron; and I do not claim any such combination wherein the plain, smooth, hard cylindrical surface of a roller turning in contact with a flexible endless apron is not capable of absorbing or engaging with, and carrying along, successive portions of the pasty starch and beating the same into the texture of articles of woven fabric held between the rotating roller and apron, and whereby the apron and articles thereon cannot be subjected to any such rapidly-repeated concussions, vibrations, and bendings as are given by the longitudinally ribbed or corrugated rotary roller B to the yielding endless apron C and articles thereon in my above-described improved starching-machine.

I am also aware that before my invention a reservoir for holding and delivering semi-fluid material, and having in its lower part a contracted discharge-aperture furnished with a hand valve or gate, was arranged so as to deliver the semi-fluid material upon a molding in the form of a straight bar under a non-rotary presser and scraper, but not between and upon an endless apron and rotary ribbed or corrugated roller in surface contact with said apron.

What I claim as my invention is—

1. In a starching-machine, the combination, with the rotary rubbing-roll having its surface composed of a series of alternate projections and depressions, substantially as set forth, of the flexible endless apron, by one stretch of which the articles being starched are supported with a yielding pressure against the rubbing-roll, substantially as described.

2. In a starching-machine, the combination, with the rubbing-roll having its surface composed of a series of alternate projections and depressions, as specified, and endless apron for supporting the articles against the rubbing-roll, of means, substantially as set forth, for turning the contiguous surfaces of the rubbing-roll and endless apron in the same direction at different speeds, substantially as described.

3. In a starching-machine, the combination, with the rubbing-roll, of the endless apron sustained at one end of its stretches by a projecting support, I, extending with the apron past the rubbing-roll, substantially as described, and around which projecting portion of the apron and its support the tubular body of a shirt can be drawn in starching the front of the shirt without starching the back thereof, as set forth.

4. In a starching-machine, the combination, with the rubbing-roll and the endless apron and its support projecting past the rubbing-roll, of a guard, J, along that part of the projecting portion of the endless apron which is not in the stretch against the rubbing-roll, substantially as described.

5. In a starching-machine, the combination, with the longitudinally ribbed or corrugated rubbing-roll and the flexible endless apron, by one stretch of which the articles being starched are supported against the rubbing-roll, of a tension-roller, N, pressed against the inner surface of one stretch of the endless apron by adjustable yielding devices, substantially as described.

6. In a starching-machine, the combination, with the endless apron C and the rotary ribbed or corrugated roller B in contact with the endless apron and arranged therewith, as set forth, of the stationary reservoir K, having in its lower part the contracted outlet $c$, furnished with the valve or valves $d$, and arranged directly over the entrance $y$, between the said roller and endless apron, substantially as shown and described.

In testimony whereof I hereunto set my hand, in the presence of two subscribing witnesses, this 19th day of March, 1880.

NICHOLAS TAYLOR.

Witnesses:
JAMES H. SLADE,
JAMES T. GOODFELLOW.